No. 868,171. PATENTED OCT. 15, 1907.
F. EICHBERG.
CONTROL OF ALTERNATING CURRENT MOTORS.
APPLICATION FILED JAN. 26, 1907.

Witnesses:

Inventor:
Friedrich Eichberg,
by
Atty.

UNITED STATES PATENT OFFICE.

FRIEDRICH EICHBERG, OF BERLIN, GERMANY, ASSIGNOR TO GENERAL ELECTRIC COMPANY, A CORPORATION OF NEW YORK.

CONTROL OF ALTERNATING-CURRENT MOTORS.

No. 868,171.

Specification of Letters Patent.

Patented Oct. 15, 1907.

Application filed January 26, 1907. Serial No. 354,228.

*To all whom it may concern:*

Be it known that I, FRIEDRICH EICHBERG, a subject of the Emperor of Austria, residing at Berlin, in the Empire of Germany, have invented certain new and useful Improvements in the Control of Alternating-Current Motors, of which the following is a specification.

My invention relates to the control of alternating-current motors of the type in which the rotor is provided with commutator and brushes short-circuiting the rotor on the line of magnetization of the stator winding, and its object is to provide a novel method of control, whereby the motor connections may be changed from series to shunt without interrupting the motor circuit.

It is well known in the art that, in order to secure a high starting torque in an alternating-current motor operated from a single-phase source, it is essential that the currents in stator and rotor should be in phase, and that this condition can be secured by connecting the motor as a series motor. For many purposes, however, it is desirable that the motor should operate practically at constant speed, and this result cannot be obtained by series connections, but may be obtained by a shunt connection.

By my invention I am enabled to start the motor as a series motor, and to transform it to a shunt motor when up to speed, without interrupting the motor-circuit.

Figure 1:
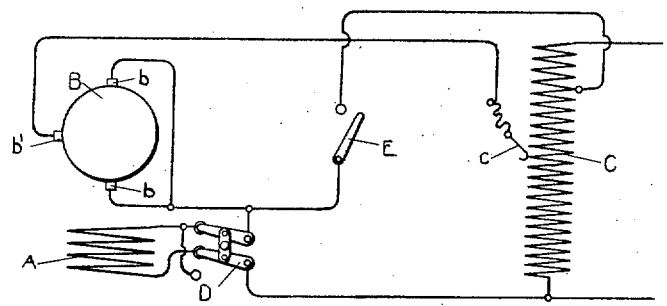
Figure 2:
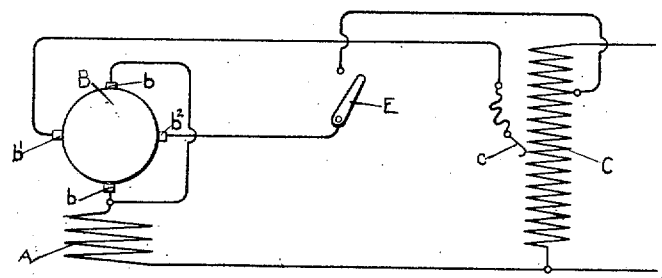

My invention will best be understood by reference to the accompanying drawing, in which Figure 1 shows diagrammatically a motor arranged for control in accordance with my invention; and Fig. 2 shows a modification of the same.

In Fig. 1, A represents the stator winding, and B the rotor winding, which is provided with commutator brushes $b$ $b$ arranged and connected to short-circuit the rotor winding on the line of magnetization of the stator-winding A. $b^1$ represents another commutator brush displaced substantially ninety electrical degrees from the short-circuited brushes. C represents a compensator or transformer winding, or other suitable source of alternating-current. $c$ represents a movable contact connected to the brush $b^1$ and arranged to connect this brush to different points on the compensator winding C. D represents a reversing switch for reversing the connections of the stator winding A, so as to reverse the direction of rotation of the motor. E represents a switch which, at starting, is open, as shown.

The starting connections are as shown in Fig. 1. One terminal of the stator winding A is connected to one terminal of the compensator winding C, while the other terminal of the stator winding is connected to the short-circuited brushes $b$ $b$. The brush $b^1$ is connected through the contact $c$ to a point on the compensator winding C. The motor is thus connected as a series motor with half the rotor turns in circuit. The short circuit between the brushes $b$ $b$ on the line of magnetization of the stator winding serves to neutralize the self-induction of the stator winding in a manner that is now well-understood in the art the whole rotor winding being included in the short-circuit. The motor at starting, consequently, possesses the characteristics of a compensated series motor. The starting current may be regulated by means of the contact $c$, by the adjustment of which the voltage impressed on the motor may be controlled. When the motor is up to speed, the switch E is closed, connecting the upper terminal of the stator winding A directly to a point on the compensator winding C, and at the same time establishing a second connection from the rotor winding to the compensator. The stator and rotor are consequently connected in shunt, and the motor operates as a shunt motor, and consequently at practically constant speed.

It is sometimes desirable to employ a greater number of turns for the excitation when the motor is connected as a shunt motor, than when it is connected as a series motor, and this result may be secured with a motor arranged in accordance with my invention by providing the rotor with a fourth brush $b^2$, as shown in Fig. 2. With the motor arranged as shown in this figure the starting connections are precisely the same as in Fig. 1, but the switch E, instead of being connected to the point of connection of the stator winding and short-circuited brushes, is connected to the brush $b^2$. When this switch is closed, the shunt-excitation for the rotor is impressed on the brushes $b^1$ and $b^2$, and consequently, the whole rotor winding is employed for producing the shunt excitation.

What I claim as new and desire to secure by Letters Patent of the United States, is:

1. The method of controlling an alternating-current motor having a commutator and brushes short-circuiting the rotor on the line of magnetization of the stator winding, which consists in starting it as a series motor by connecting rotor and stator in series to the source using the short-circuited brushes as one rotor terminal, and impressing a shunt excitation on the rotor when up to speed at an angle to the line of the rotor short-circuit.

2. The method of controlling an alternating-current motor having a commutator and brushes short-circuiting the rotor on the line of magnetization of the stator winding, which consists in connecting the stator in series with half the rotor winding at starting by using the short-circuited brushes as one rotor terminal, and impressing a shunt excitation on the whole rotor winding when the motor is up to speed.

3. In an alternating-current motor, a stator winding, a rotor winding provided with a commutator and brushes short-circuiting the rotor on the line of magnetization of the stator winding, a connection between said brushes and one terminal of the stator winding, a commutator brush displaced substantially ninety electrical degrees from the short-circuited brushes, connections from said brush and from the other stator terminal to a source of current, and means for establishing another connection from the rotor to the source when the motor is up to speed.

4. In an alternating-current motor, a stator winding, a rotor winding provided with a commutator and brushes short-circuiting the rotor on the line of magnetization of the stator winding, a connection between said brushes and one terminal of the stator winding, commutator brushes on a line at right-angles to the line of the short-circuited brushes, connections from one of the last-mentioned brushes and from the other stator terminal to a source of current, and a switch arranged to connect the other of the last-mentioned brushes to the source when the motor is up to speed.

5. In an alternating-current motor, a stator winding, a rotor winding provided with a commutator and brushes short-circuiting the rotor on the line of magnetization of the stator winding, a connection between said brushes and one terminal of the stator winding, a commutator brush displaced substantially ninety electrical degrees from the short-circuited brushes, connections from said brush and from the other stator terminal to a source of current, means for varying the voltage impressed by said source on said connections, and means for establishing another connection from the rotor to the source when the motor is up to speed.

6. In an alternating-current motor, a stator winding, a rotor winding provided with a commutator and brushes short-circuiting the rotor on the line of magnetization of the stator winding, a connection between said brushes and one terminal of the stator winding, commutator brushes on a line at right-angles to the line of the short-circuited brushes, connections from one of the last mentioned brushes and from the other stator terminal to a source of current, means for varying the voltage impressed by said source on said connections, and a switch arranged to connect the other of the last-mentioned brushes to the source when the motor is up to speed.

In witness whereof, I have hereunto set my hand this eighth day of January, 1907.

FRIEDRICH EICHBERG.

Witnesses:
EMANUEL ROSENBERG,
MAXIMILIAN FINNER.